United States Patent
Chen et al.

(10) Patent No.: US 9,203,804 B2
(45) Date of Patent: Dec. 1, 2015

(54) METHOD AND SYSTEM FOR DEFENDING AGAINST MALWARE AND METHOD FOR UPDATING FILTERING TABLE THEREOF

(71) Applicant: Wistron Corporation, New Taipei (TW)

(72) Inventors: Chih-Ming Chen, New Taipei (TW);
Feng-Tseng Kuo, New Taipei (TW);
Horng-Song Wu, New Taipei (TW)

(73) Assignee: Wistron Corporation, New Taipei (TW)

( * ) Notice: Subject to any disclaimer, the term of this patent is extended or adjusted under 35 U.S.C. 154(b) by 37 days.

(21) Appl. No.: 14/177,230

(22) Filed: Feb. 11, 2014

(65) Prior Publication Data

US 2015/0121450 A1    Apr. 30, 2015

(30) Foreign Application Priority Data

Oct. 25, 2013    (TW) .............................. 102138749 A

(51) Int. Cl.
*H04L 29/06*    (2006.01)

(52) U.S. Cl.
CPC .................................. *H04L 63/0227* (2013.01)

(58) Field of Classification Search
None
See application file for complete search history.

(56) References Cited

U.S. PATENT DOCUMENTS

| | | | |
|---|---|---|---|
| 2005/0182950 A1* | 8/2005 | Son et al. | 713/189 |
| 2006/0064755 A1* | 3/2006 | Azadet et al. | 726/24 |
| 2006/0153204 A1* | 7/2006 | Wang et al. | 370/400 |
| 2011/0314547 A1* | 12/2011 | Yoo | 726/24 |
| 2013/0055238 A1 | 2/2013 | Lee et al. | |
| 2015/0096022 A1* | 4/2015 | Vincent et al. | 726/23 |

OTHER PUBLICATIONS

"Office Action of Taiwan Counterpart Application" with partial English translation, issued on Aug. 6, 2015, p. 1-p. 12.

* cited by examiner

*Primary Examiner* — David Pearson
(74) *Attorney, Agent, or Firm* — Jianq Chyun IP Office

(57) ABSTRACT

A method and a system for defending against malware and a method for updating a filtering table thereof are provided. The method for defending against malware includes: receiving a network packet by an electronic device, which stores a filtering table; determining whether the network packet conforms to a specific filtering rule of the filtering table by the electronic device; if the network packet conforms to the specific filtering rule, performing a specific operation on the network packet by the electronic device according to the specific filtering rule; and if the network packet does not conform to the specific filtering rule, uploading characteristic information of the network packet to a malware analyzing device by the electronic device.

22 Claims, 5 Drawing Sheets

METHOD AND SYSTEM FOR DEFENDING AGAINST MALWARE AND METHOD FOR UPDATING FILTERING TABLE THEREOF

CROSS-REFERENCE TO RELATED APPLICATION

This application claims the priority benefit of Taiwan application serial no. 102138749, filed on Oct. 25, 2013. The entirety of the above-mentioned patent application is hereby incorporated by reference herein and made a part of this specification.

BACKGROUND OF THE INVENTION

1. Field of the Invention

The invention relates to an information security technology and particularly relates to a method and a system for defending against malware and a method for updating a filtering table thereof.

2. Description of Related Art

As the information technology advances, Internet has become an indispensable part to the modern life. For example, through using a computer at home, the user can easily chat with his/her friends who are far away, download files, or shop on-line via the Internet. However, as a consequence, it also becomes easier for malware to enter the user's computer. For example, when the user uses the Internet to download an application or multimedia file from an unknown source, malware may be downloaded to the user's computer together with the application or multimedia file, which exposes the user's information in the computer, such as username and password, to hackers.

In addition, as the system performance of multimedia playing devices, such as smart TV and set top box (STB), continues to improve, multimedia playing devices have been used as small personal computers and gradually become targets of Internet hackers. Nevertheless, it is not easy for multimedia playing devices that have limited data processing capability to run the traditional antivirus software or intrusion detection system. Therefore, it is necessary to develop a malware defending system that provides a certain degree of protection but has relatively lower system requirements, for improving the security of multimedia playing devices.

SUMMARY OF THE INVENTION

The invention provides a malware defending method and a malware defending system, which provide a device at a user end a certain degree of malware defending capability and effectively reduce consumption of system resources at the user end.

The invention provides a filtering table updating method, which coordinates the device at the user end and a device at a server end to generate a new filtering rule for updating a filtering table in the device at the user end.

The invention provides a malware defending method, which includes: receiving a network packet by an electronic device, wherein the electronic device stores a filtering table therein; determining whether the network packet conforms to a specific filtering rule in the filtering table by the electronic device; executing a specific operation on the network packet according to the specific filtering rule by the electronic device if the network packet conforms to the specific filtering rule in the filtering table; and uploading characteristic information of the network packet to a malware analyzing device by the electronic device if the network packet does not conform to the specific filtering rule in the filtering table.

In an exemplary embodiment of the invention, the electronic device further stores a malware characteristic group, and the malware defending method further includes: executing a malware characteristic checking procedure on the network packet according to the malware characteristic group by the electronic device to generate the characteristic information of the network packet.

In an exemplary embodiment of the invention, a first malware characteristic group of the malware characteristic group includes a plurality of malware characteristics, and the step of executing the malware characteristic checking procedure on the network packet according to the malware characteristic group by the electronic device includes: in a first malware characteristic checking procedure corresponding to the first malware characteristic group, sequentially checking data in the network packet by the electronic device in a position order that the malware characteristics correspond to the network packet.

In an exemplary embodiment of the invention, the malware defending method further includes: determining whether the network packet contains malware according to the characteristic information of the network packet by the malware analyzing device; generating a filtering rule corresponding to the malware and transmitting an updated command by the malware analyzing device, if the network packet contains the malware, and receiving the updated command from the malware analyzing device by the electronic device, and adding the filtering rule corresponding to the malware to the filtering table according to the updated command.

In an exemplary embodiment of the invention, the malware analyzing device stores a malware script corresponding to the malware characteristic group, and the step of determining whether the network packet contains the malware according to the characteristic information of the network packet by the malware analyzing device includes: re-sorting the characteristic information of the network packet according to the malware script by the malware analyzing device; and determining whether the network packet contains the malware according to the re-sorted characteristic information by the malware analyzing device.

In an exemplary embodiment of the invention, the filtering rule corresponding to the malware is set as a removing command by the malware analyzing device if the malware is removable malware. The filtering rule corresponding to the malware is set as a blocking command by the malware analyzing device if the malware is not removable malware.

In an exemplary embodiment of the invention, the malware defending method further includes: when the electronic device receives another network packet that contains the malware, at least a part of the malware in the another network packet is removed according to the removing command by the electronic device or the another network packet is blocked according to the blocking command by the electronic device.

In an exemplary embodiment of the invention, the malware defending method further includes: simulating a user behavior and recording an abnormal behavior that an application or a web page executes in response to the user behavior by the malware analyzing device; generating a filtering rule corresponding to the application or the web page and transmitting an updated command by the malware analyzing device, if the abnormal behavior is illegal; and receiving the updated command from the malware analyzing device by the electronic device and adding the filtering rule corresponding to the application or the web page to the filtering table according to the updated command.

In an exemplary embodiment of the invention, the malware defending method further includes: transmitting a network control command by the malware analyzing device, if highly contagious malware exists in a network environment of the electronic device; and receiving the network control command from the malware analyzing device by the electronic device, and controlling at least a portion of a connection between the electronic device and an Internet according to the network control command.

The invention further provides a malware defending system, which includes an electronic device and a malware analyzing device. The electronic device includes a first network module, a first database module, and a preliminary processing module. The first network module is used for receiving a network packet. The first database module is used for storing a filtering table. The preliminary processing module is coupled to the first network module and the first database module and is used for determining whether the network packet conforms to a specific filtering rule in the filtering table. The preliminary processing module further executes a specific operation on the network packet according to the specific filtering rule if the network packet conforms to the specific filtering rule in the filtering table. The preliminary processing module further uploads characteristic information of the network packet to the malware analyzing device via the first network module if the network packet does not conform to the specific filtering rule in the filtering table.

In an exemplary embodiment of the invention, the first database module further stores a malware characteristic group. The preliminary processing module further executes a malware characteristic checking procedure on the network packet according to the malware characteristic group to generate the characteristic information of the network packet.

In an exemplary embodiment of the invention, a first malware characteristic group of the malware characteristic group includes a plurality of malware characteristics. In a first malware characteristic checking procedure corresponding to the first malware characteristic group, the preliminary processing module further sequentially checks data in the network packet in a position order that the malware characteristics correspond to the network packet.

In an exemplary embodiment of the invention, the malware analyzing device includes a second network module and an advanced processing module. The second network module is used for receiving the characteristic information of the network packet. The advanced processing module is coupled to the second network module and is used for determining whether the network packet contains malware according to the characteristic information of the network packet. The advanced processing module further generates a filtering rule corresponding to the malware and transmits an updated command via the second network module to the electronic device, if the network packet contains the malware. The preliminary processing module further adds the filtering rule corresponding to the malware to the filtering table according to the updated command.

In an exemplary embodiment of the invention, the malware analyzing device further includes a second database module. The second database module is coupled to the advanced processing module and is used for storing a malware script corresponding to the malware characteristic group. The advanced processing module further re-sorts the characteristic information of the network packet according to the malware script. The advanced processing module further determines whether the network packet contains the malware according to the re-sorted characteristic information.

In an exemplary embodiment of the invention, the advanced processing module further sets the filtering rule corresponding to the malware as a removing command if the malware is removable malware. The advanced processing module further sets the filtering rule corresponding to the malware as a blocking command if the malware is not removable malware.

In an exemplary embodiment of the invention, when the first network module receives another network packet that contains the malware, the preliminary processing module further removes at least a part of the malware in the another network packet according to the removing command or blocks the another network packet according to the blocking command.

In an exemplary embodiment of the invention, the advanced processing module further simulates a user behavior and records an abnormal behavior that an application or a web page executes in response to the user behavior. The advanced processing module further generates a filtering rule corresponding to the application or the web page and transmits an updated command to the electronic device if the abnormal behavior is illegal. The preliminary processing module further adds the filtering rule corresponding to the application or the web page to the filtering table according to the updated command.

In an exemplary embodiment of the invention, the advanced processing module further transmits a network control command via the second network module to the electronic device if highly contagious malware exists in a network environment of the electronic device. The preliminary processing module further controls at least a portion of a connection between the first network module and an Internet according to the network control command.

In addition, the invention further provides a filtering table updating method, which includes: executing a malware characteristic checking procedure on a network packet according to a malware characteristic group by an electronic device to generate characteristic information of the network packet and upload the characteristic information of the network packet to a malware analyzing device; determining whether the network packet contains malware according to the characteristic information of the network packet by the malware analyzing device; generating a filtering rule corresponding to the malware and transmitting an updated command to the electronic device by the malware analyzing device, if the network packet contains the malware; and adding the filtering rule corresponding to the malware to a filtering table according to the updated command by the electronic device.

In an exemplary embodiment of the invention, a first malware characteristic group of the malware characteristic group includes a plurality of malware characteristics, and a step of executing the malware characteristic checking procedure on the network packet according to the malware characteristic group by the electronic device includes: in a first malware characteristic checking procedure corresponding to the first malware characteristic group, sequentially checking data in the network packet by the electronic device in a position order that the malware characteristics correspond to the network packet.

In an exemplary embodiment of the invention, the malware analyzing device stores a malware script corresponding to the malware characteristic group, and a step of determining whether the network packet contains the malware according to the characteristic information of the network packet by the malware analyzing device includes: re-sorting the characteristic information of the network packet according to the malware script by the malware analyzing device; and determining whether the network packet contains the malware according to the re-sorted characteristic information by the malware analyzing device.

In an exemplary embodiment of the invention, the filtering table updating method further includes: simulating a user behavior and recording an abnormal behavior that an application or a web page executes in response to the user behavior by the malware analyzing device; generating a filtering rule corresponding to the application or the web page and transmitting an updated command to the electronic device by the malware analyzing device, if the abnormal behavior is illegal; and adding the filtering rule corresponding to the application or the web page to the filtering table according to the updated command by the electronic device.

Based on the above, the invention only requires the electronic device at the user end to perform simple comparison of the packet content, and leaves the sorting and determination, which require more system resources, to be executed by the malware analyzing device at the server end, thereby achieving the effects of improving the malware defending capability of the electronic device and reducing consumption of the system resources.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
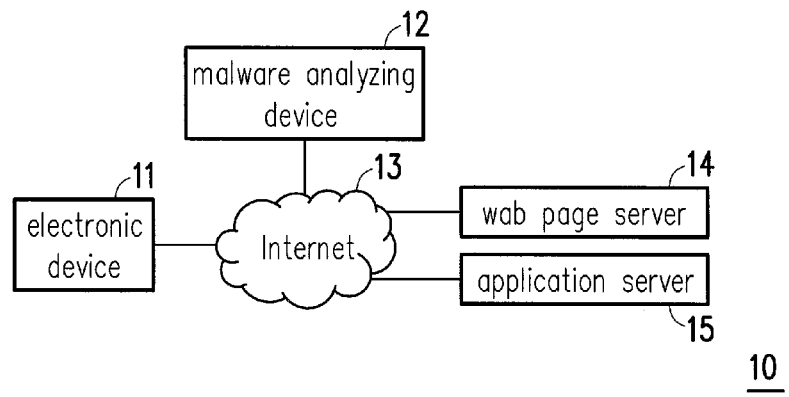
FIG. 1 is a schematic diagram depicting a malware defending system according to an exemplary embodiment of the invention.

FIG. 1 is a schematic diagram depicting a malware defending system according to an exemplary embodiment of the invention.

With reference to FIG. 1, a malware defending system 10 includes an electronic device 11 and a malware analyzing device 12.

In this exemplary embodiment, the electronic device 11 may be an electronic device having limited data processing capability, such as a smart phone, a smart TV, or a set top box (STB), etc. Moreover, in an embodiment, the electronic device 11 may be any electronic device that has functions of networking, wired transmission, and/or wireless transmission, such as a smart phone, a tablet PC, a notebook computer, or a desktop computer, etc. However, the invention is not limited thereto.

In this exemplary embodiment, the malware analyzing device 12 may be a computer host or a malware analyzing platform formed by a plurality of computer hosts connected through an internal network or an external network (e.g. Internet 13). In an exemplary embodiment, the data processing capability of the malware analyzing device 12 may be several times more powerful than the data processing capability of the electronic device 11. In particular, the malware analyzing device 12 has relatively powerful data processing capability in comparison with the electronic device 11 that has limited data processing capability, which may be a smart phone, a smart TV, or a STB, etc.

In addition, the electronic device 11 and the malware analyzing device 12 are both connected to the Internet 13 in a wired or wireless manner, so as to receive or transmit a network packet.

Figure 2:
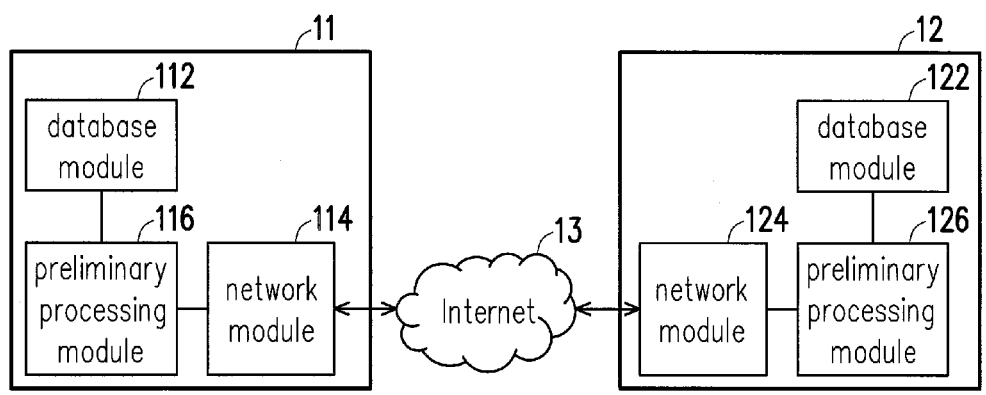
FIG. 2 is a schematic diagram depicting an electronic device and a malware analyzing device according to an exemplary embodiment of the invention.

FIG. 2 is a schematic diagram depicting an electronic device and a malware analyzing device according to an exemplary embodiment of the invention.

With reference to FIG. 2, the electronic device 11 includes a database module 112, a network module 114, and a preliminary processing module 116.

For example, the database module 112 is disposed in a storage medium (not shown), such as a memory or a hard drive disc (HDD), of the electronic device 11.

The network module 114 includes a wired/wireless network interface card (NIC). The network module 114 may receive a network packet from the Internet 13 or transmit a network packet to the Internet 13 in a wired or wireless manner.

The preliminary processing module 116 is for example in a hardware circuit form and is disposed in a system chip set (not shown), such as a processor or a micro-processor, of the electronic device 11. Moreover, the preliminary processing module 116 is coupled to the database module 112 and the network module 114. Alternatively, in an exemplary embodiment, the preliminary processing module 116 may be in a software or firmware module form and stored in the storage medium of the electronic device 11 to be loaded and operated by the processor or micro-processor of the electronic device 11. Nevertheless, the invention is not limited thereto.

The malware analyzing device 12 includes a database module 122, a network module 124, and an advanced processing module 126. Similar to the database module 112, the database module 122 is for example disposed in a storage medium (not shown), such as a memory or a hard drive disc (HDD), of the malware analyzing device 12. Similar to the network module 114, the network module 124 includes a wired/wireless network interface card (NIC) for receiving or transmitting a network packet in a wired/wireless manner. Similar to the preliminary processing module 116, the advanced processing module 126 is for example in a hardware circuit form and disposed in a system chip set (not shown), such as a processor, of the malware analyzing device 12. Moreover, the advanced processing module 126 is coupled to the database module 122 and the network module 124. In an exemplary embodiment, the advanced processing module 126 may be in a software or firmware module form and stored in the storage medium of the malware analyzing device 12 to be loaded and operated by the processor of the malware analyzing device 12. Nevertheless, the invention is not limited thereto.

In an exemplary embodiment, the database module 112 stores a filtering table therein. The filtering table usually includes a plurality of filtering rules, and each of the filtering rules may include a specific string and/or symbol. For instance, in an exemplary embodiment, when the electronic device 11 (or the network module 114) receives a network packet, the preliminary processing module 116 may determine whether the network packet conforms to certain filtering rules (collectively referred to as "at least one specific filtering rule" hereinafter) in the filtering table. If the network packet conforms to the at least one specific filtering rule, the preliminary processing module 116 may execute a specific operation on the network packet according to the at least one specific filtering rule, such as letting the network packet to pass, blocking the network packet, or amending partial packet content of the network packet, etc.

Furthermore, the filtering rules may be used to identify a network packet that may contain malware. For instance, when the user downloads a movie from the Internet 13 by the electronic device 11 that includes a STB, the electronic device 11 (or the preliminary processing module 116) may determine whether a header and/or a payload of the received network packet includes the specific string and/or symbol in the filtering table according to a predetermined comparison rule. If the header and/or the payload of the received network packet include the specific string and/or symbol in the filtering table, it indicates that the network packet conforms to the filtering rule. That is to say, the downloaded movie may contain malware. Accordingly, the electronic device 11 (or the preliminary processing module 116) may block or drop the network packet according to the filtering rule to which the network packet conforms, so as to prevent the malware in the network packet from entering a file system of the electronic device 11. Alternatively, in an exemplary embodiment, the electronic device 11 (or the preliminary processing module 116) may destroy the known malware in the network packet by executing a specific operation, such as eliminating the specific string and/or symbol in the network packet which conforms to the filtering table.

In an exemplary embodiment, the filtering table may further include a whitelist and a blacklist. If the network packet conforms to a filtering rule in the blacklist, the electronic device 11 (or the preliminary processing module 116) blocks or amends the network packet. If the network packet conforms to a filtering rule in the whitelist, the electronic device 11 (or the preliminary processing module 116) allows the network packet to enter the file system of the electronic device 11.

In addition, if the received network packet does not conform to any of the filtering rules of the filtering table, it indicates that the content in the header and/or the payload of the network packet has not been predefined in the filtering rules, and the probability that the received network packet contains malware is not high. Thus, the electronic device 11 (or the preliminary processing module 116) allows the network packet to enter the file system of the electronic device 11, for example.

It is worth mentioning that a network packet that does not conform to any filtering rule of the filtering table may be clear or may contain new malware having a characteristic that has not been defined in the filtering rules. Therefore, in an exemplary embodiment, the database module 112 further stores one or more than one malware characteristic group, and the database module 122 stores one or more than one malware script. Each of the malware characteristic groups includes one or more than one malware characteristic, and each of the malware characteristic groups corresponds to one of the malware scripts. In addition, the malware scripts may also be called virus scripts or virus patterns. If the received network packet does not conform to any of the filtering rules of the filtering table, the electronic device 11 (or the preliminary processing module 116) may execute a malware characteristic checking procedure on the received network packet according to the malware characteristic group stored in the database module 112. After executing the malware characteristic checking procedure, the electronic device 11 (or the preliminary processing module 116) generates characteristic information of the network packet and uploads the characteristic information of the network packet to the malware analyzing device 12 via the network module 114.

Moreover, in an exemplary embodiment, the electronic device 11 (or the preliminary processing module 116) may also execute the malware characteristic checking procedure at a timing when the electronic device 11 (or the network module 114) receives any network packet, etc. Nevertheless, the invention is not limited to the above.

More specifically, it is given that one malware characteristic group corresponds to one malware characteristic checking procedure. If the database module 112 stores a plurality of malware characteristic groups therein, the electronic device 11 (or the preliminary processing module 116) may execute a plurality of malware characteristic checking procedures in parallel on the network packet according to the malware characteristic groups. An example of execution of the malware characteristic checking procedure is explained in detail below with reference to the accompanying figures.

Figure 3A:
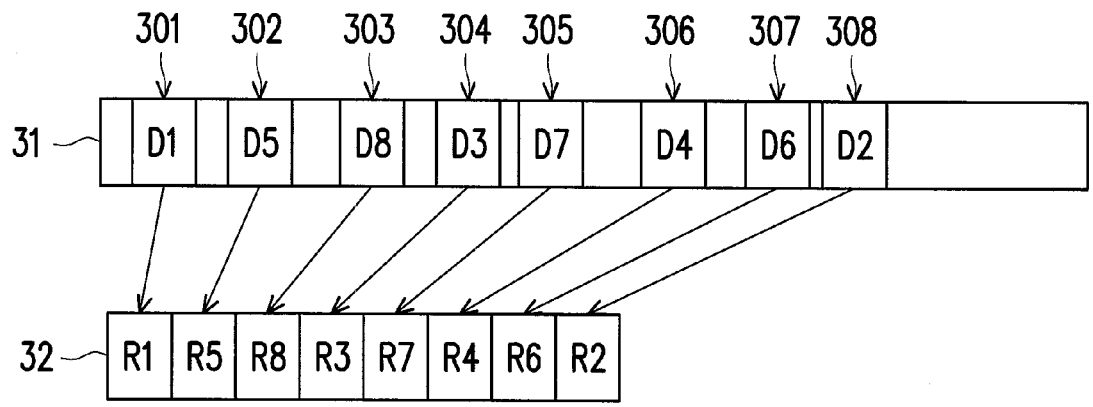
FIG. 3A is a schematic diagram depicting execution of a malware characteristic checking procedure according to an exemplary embodiment of the invention.

FIG. 3A is a schematic diagram depicting execution of a malware characteristic checking procedure according to an exemplary embodiment of the invention.

With reference to FIG. 3A, it is given that the database module 112 stores a first malware characteristic group and a second malware characteristic group therein, wherein the first malware characteristic group is used for checking specific malware or malware of a specific type, and the second malware characteristic group is used for checking another specific malware or malware of another specific type. The electronic device 11 (or the preliminary processing module 116) may check packet content (including header and payload) of a network packet 31 in sequence from a position 301 to a position 308 according to the first malware characteristic group and the second malware characteristic group in parallel, and generate characteristic information 32 of the network packet 31 according to a checking result.

In other words, given that a first malware characteristic checking procedure corresponds to the first malware characteristic group and a second malware characteristic checking procedure corresponds to the second malware characteristic group, the electronic device 11 (or the preliminary processing module 116) may execute the first malware characteristic checking procedure and the second malware characteristic checking procedure in parallel. In the first malware characteristic checking procedure, the electronic device 11 (or the preliminary processing module 116) may check data in the network packet 31 in sequence by positions in the network packet 31 which respectively correspond to a plurality of malware characteristics in the first malware characteristic group. For example, data D1 in the position 301 of the network packet 31 is checked first, and then data D3 in a position 304 is checked. Following that, data D4 in a position 306 is checked, and finally, data D2 in the position 308 is checked. A checking method for example includes: sequentially comparing the malware characteristics in the first malware characteristic group that respectively correspond to the positions 301, 304, 306, and 308 with the data D1, D3, D4, and D2, so as to generate checking results R1, R3, R4, and R2. For example, if the data D1 conforms to one malware characteristic in the first malware characteristic group corresponding to the position 301 while the data D3, D4, and D2 do not conform to the rest of the malware characteristics in the first malware characteristic group corresponding to the positions 304, 306, and 308, the generated checking results are R1=1, R3=0, R4=0, and R2=0, for example.

Likewise, in the second malware characteristic checking procedure, the electronic device 11 (or the preliminary processing module 116) may check data in the network packet 31 in sequence by positions in the network packet 31 which respectively correspond to a plurality of malware characteristics in the second malware characteristic checking procedure. For example, data D5 in a position 302 of the network packet 31 is checked first, and then data D8 in a position 303 is checked. Following that, data D7 in a position 305 is checked, and finally, data D6 in a position 307 is checked. A checking method for example includes: sequentially comparing the malware characteristics in the second malware characteristic checking procedure that respectively correspond to the positions 302, 303, 305, and 307 with the data D5, D8, D7, and D6, so as to generate checking results R5, R8, R7, and R6. In other words, in this exemplary embodiment, the characteristic information 32 at least includes the checking results R1, R5, R8, R3, R7, R4, R6, and R2.

Particularly, in an exemplary embodiment, because the electronic device 11 has limited data processing capability, the electronic device 11 is not suitable for executing an advanced data processing procedure, such as data sorting. Therefore, in an exemplary embodiment, the checking results R1, R5, R8, R3, R7, R4, R6, and R2 in the characteristic information 32 are sorted in an order that the electronic device 11 (or the preliminary processing module 116) checks the data in the network packet 31. For example, the checking result R1 is generated first because the data D1 in the position 301 is checked first, and the checking result R2 is generated at last because the data D2 in the position 308 is checked at last. Then, the electronic device 11 (or the preliminary processing module 116) timely uploads the characteristic information 32 to the malware analyzing device 12 via the network module 114.

It is worth mentioning that, for the network packet, the characteristic information (e.g. the checking result of the malware characteristic checking procedure) of the network packet has relatively less data. Thus, the user who is operating the electronic device 11 may not notice that the electronic device 11 is uploading characteristic information of multiple network packets in a short period of time. Moreover, the malware characteristic checking procedure executed by the electronic device 11 includes only simple comparison of the packet content. Thus, even if the electronic device 11 executes a plurality of malware characteristic checking procedures in a short period of time, the consumption of the computing resources of the electronic device 11 may not affect the user's operation on the electronic device 11. That is, in comparison with the prior art that executes virus scan solely in the end user computer system and consumes a lot of system resources or transmits a great deal of network packet content to execute malware detection solely at the server and occupies a large amount of end user network bandwidth, the invention is conducive to reducing occupation of the end user network traffic and reducing consumption of the system resources at the user end while effectively improving protection of the electronic device at the user end against malware.

When the malware analyzing device 12 (or the network module 124) receives the characteristic information of the network packet from the electronic device 11, the malware analyzing device 12 (or the advanced processing module 126) may determine whether the network packet contains malware according to the characteristic information of the network packet. In particular, the characteristic information of the network packet received by the malware analyzing device 12 does not necessarily conform to a data analyzing order of the malware script. Therefore, in an exemplary embodiment, before determining whether the network packet contains malware, the malware analyzing device 12 (or the advanced processing module 126) re-sorts the characteristic information of the network packet according to the data analyzing order or a malware detection rule of the malware script, and determines whether the network packet contains malware according to the re-sorted characteristic information. An operation of re-sorting the characteristic information of the network packet is explained in detail below with reference to the figures.

Figure 3B:
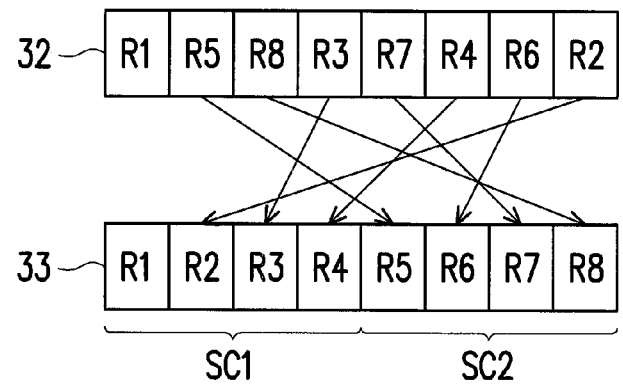
FIG. 3B is a schematic diagram depicting re-sorting characteristic information of a network packet according to an exemplary embodiment of the invention.

FIG. 3B is a schematic diagram depicting re-sorting characteristic information of a network packet according to an exemplary embodiment of the invention.

Following the example illustrated by FIG. 3A, please refer to FIG. 3B. After receiving the characteristic information 32, the malware analyzing device 12 (or the advanced processing module 126) re-sorts the characteristic information 32 into a sorted checking result sequence 33 according to a first malware script SC1 stored in the database module 122 corresponding to the first malware characteristic group and a second malware script SC2 stored in the database module 122 corresponding to the second malware characteristic group. For instance, the malware analyzing device 12 (or the advanced processing module 126) may move the checking results R1, R3, R4, and R2 of the first malware characteristic checking procedure to a first half of the sorted checking result sequence 33, and move the checking results R5, R8, R7, and R6 of the second malware characteristic checking procedure to a latter half of the sorted checking result sequence 33, for sequentially using the first malware script SC1 and the second malware script SC2 to check malware.

Next, it is given that the data analyzing order of the first malware script SC1 is to check the data D1 first and then selectively check the data D3 or D4 based on the data D2, and the data analyzing order of the second malware script SC2 is to selectively check the data D6, D7, or D8 based on the data D5. The malware analyzing device 12 (or the advanced processing module 126) may re-sort the checking results R1, R3, R4, and R2 in the first half of the sorted checking result sequence 33 into "R1, R2, R3, and R4" to conform to the data analyzing order of the first malware script SC1, and re-sort the checking results R5, R8, R7, and R6 in the latter half of the sorted checking result sequence 33 into "R5, R6, R7, and R8" to conform to the data analyzing order of the second malware script SC2.

Thereafter, comparison is made. When the malware analyzing device 12 (or the advanced processing module 126) finds that "R1, R2, R3, and R4" conforms to a malware detection rule of the first malware script SC1 (e.g. R1=1, R2=1, R3=1) and/or "R5, R6, R7, and R8" conforms to a malware detection rule of the second malware script SC2 (e.g. R5=1 and R7=1), the malware analyzing device 12 (or the advanced processing module 126) determines that the network packet 31 contains malware. In addition, the malware analyzing device 12 (or the advanced processing module 126) may further obtain relevant information (e.g. type) of the malware contained in the network packet 31. For example, when the sorted checking result sequence 33 conforms to the malware detection rule of the first malware script SC1, it indicates that the network packet 31 contains a specific type of malware. When the sorted checking result sequence 33 conforms to the malware detection rule of the second malware script SC2, it indicates that the network packet 31 contains another specific type of malware. Or, when the sorted checking result sequence 33 conforms to both the malware detection rule of the first malware script SC1 and the malware detection rule of the second malware script SC2, it indicates that the network packet 31 contains two specific types of malware.

Thereafter, when the malware analyzing device 12 (or the advanced processing module 126) determines that the network packet contains one (or more than one) malware, the malware analyzing device 12 (or the advanced processing module 126) may generate a filtering rule corresponding to the malware. For example, the malware analyzing device 12 (or the advanced processing module 126) may conclude the filtering rule that corresponds to the malware according to the specific string and symbol corresponding to the malware in the network packet and/or source information of the network packet containing the malware (e.g. source IP address and source port), etc. For example, the filtering rule is to block a network packet from a certain IP address or a network containing a string and/or symbol that controls the electronic device 11 to send out username and password. However, the invention is not limited thereto.

In addition, in an exemplary embodiment, the malware analyzing device 12 (or the advanced processing module 126) may further determine whether the malware is removable malware. That is, if the malware may be easily eliminated or removed from the network packet, the malware is removable malware. On the other hand, if the malware is difficult to be eliminated or removed from the network packet, the malware is not removable malware. If the malware analyzing device 12 (or the advanced processing module 126) determines that the malware is removable malware, the malware analyzing device 12 (or the advanced processing module 126) sets the filtering rule corresponding to the malware as a removing command. On the other hand, if the malware analyzing device 12 (or the advanced processing module 126) determines that the malware is not removable malware, the malware analyzing device 12 (or the advanced processing module 126) sets the filtering rule corresponding to the malware as a blocking command.

Following that, the malware analyzing device 12 (or the advanced processing module 126) may transmit an updated command to the electronic device 11 via the network module 124. When the electronic device 11 (or the network module 114) receives the updated command, the electronic device 11 (or the preliminary processing module 116) adds the filtering rule corresponding to the malware to the filtering table in the database module 112 according to the updated command. For example, the malware analyzing device 12 (or the advanced processing module 126) stores the new filtering rule, i.e. the filtering rule for the malware, in an updated table in the database module 122, and then the electronic device 11 (or the preliminary processing module 116) downloads the filtering rule of the malware from the updated table via the network module 114.

Because the filtering table in the database module 112 stores the filtering rule corresponding to the malware therein, next time the electronic device 11 (or the network module 114) receives a network packet containing the malware, the electronic device 11 (or the preliminary processing module 116) is able to identify the network packet containing the malware and execute the corresponding specific operation. For example, in an exemplary embodiment, if the filtering rule corresponding to the malware is the removing command, the electronic device 11 (or the preliminary processing module 116) may remove at least a part of the malware in the network packet according to the removing command. Moreover, in an exemplary embodiment, if the filtering rule corresponding to the malware is the blocking command, the electronic device 11 (or the preliminary processing module 116) may block or directly discard the network packet according to the blocking command.

In an exemplary embodiment, according to the characteristic information of the network packet uploaded by each electronic device 11, if the malware analyzing device 12 (or the advanced processing module 126) detects that several electronic devices 11 receive network packets that contain specific malware in a predetermined time range, the malware analyzing device 12 (or the advanced processing module 126) further determines that a virus outbreak occurs. The electronic devices 11 that receive network packets containing the specific malware one after another may have a characteristic in common. For example, if the electronic devices 11 in a certain domain (e.g. having IP address of 140.116.X.X), in a certain region (e.g. Shihlin district), and/or of a certain type (e.g. smart TVs) respectively receive the network packets containing the specific malware in the same day, it indicates that at least one highly contagious malware exists in a current network environment of the electronic devices 11. Because the malware analyzing device 12 (or the advanced processing module 126) may not yet conclude a filtering rule corresponding to the highly contagious malware at this moment, the malware analyzing device 12 (or the advanced processing module 126) first transmits a network control command to each electronic device 11 in this network environment (e.g. in the same domain, in the same region, or of the same type) via the network module 124. When the electronic device 11 (or the network module 114) receives the network control command, the electronic device 11 (or the preliminary processing module 116) controls at least a portion of the connection between the electronic device 11 and the Internet 13 according to the network control command. For example, the electronic device 11 (or the preliminary processing module 116) closes a network connection to a certain IP address according to the network control command, forbids receiving any network packet from this IP address, or even temporarily cuts all external network connections, etc., until the malware analyzing device 12 (or the advanced processing module 126) concludes the filtering rule corresponding to the highly contagious malware. Accordingly, the electronic device 11 still has basic defending capability against malware during a protection window period between the virus outbreak and release of a virus code thereof.

In addition, in an exemplary embodiment, the malware analyzing device 12 (or the advanced processing module 126) may simulate a user behavior and record an abnormal behavior that an application or a web page executes in response to the user behavior. If the abnormal behavior is illegal, the malware analyzing device 12 (or the advanced processing module 126) may generate a filtering rule corresponding to the application or the web page and transmit an updated command to the electronic device 11 via the network module 124. Thereafter, when the electronic device 11 (or the network module 114) receives the updated command, the electronic device 11 (or the preliminary processing module 116) adds the filtering rule corresponding to the application or the web page to the filtering table stored in the database module 112 according to the updated command.

For instance, with reference to FIG. 1 again, in an embodiment, the malware defending system 10 may further include a web page server 14 and an application server 15. For example, the web page server 14 is a web host which stores a plurality of web pages. The application server 15 is an application maintenance host, for example, which periodically releases update/maintenance information of applications to the end user, etc.

In an exemplary embodiment, the malware analyzing device 12 (or the advanced processing module 126) performs a test on the web page provided by the web page server 14 and/or the application provided by the application server 15 according to a specific rule (e.g. 1-2 times a day), for example, to record a normal behavior executed by the web page and/or the application under test in response to the user behavior by simulating the user behavior, such as opening web pages and/or downloading files. The normal behavior may also be provided by the web page server 14 and/or the application server 15 through a procedure, such as registration or certification. After repeated tests, if a behavior (e.g. 3:00 PM, Sep. 17, 2013; collectively referred to as "abnormal behavior" hereinafter) executed by the web page provided by the web page server 14 and/or the application provided by the application server 15 in response to the user behavior is different from the previously recorded normal behavior (e.g. recorded at 6:00 AM, Sep. 17, 2013), the malware analyzing device 12 (or the advanced processing module 126) may analyze in an automatic or manual manner to determine whether this abnormal behavior is legal. If the abnormal behavior is illegal (e.g. a certain web page or a certain application executes an abnormal behavior to secretly transmit the username and password of the user to a specific host), it indicates that this web page or application may have been contaminated by malware or a code thereof has been maliciously modified. Thus, upon confirmation, the malware analyzing device 12 (or the advanced processing module 126) may add a filtering rule corresponding to this web page or application to the filtering table of the electronic device 11 according to the updated command. Accordingly, when the electronic device 11 receives a network packet again from the web page server 14 and/or the application server 15, or a network packet containing the relevant information, the network packet may be modified, blocked, or directly discarded to prevent the electronic device 11 from being contaminated by malware.

Similarly, a method by which the electronic device 11 updates the filtering table according the updated command for example includes the following. The electronic device 11 downloads the latest filtering rule from the malware analyzing device 12 via the Internet 13 according to the updated command, or the malware analyzing device 12 directly inserts the latest filtering rule in the updated command and transmits the same to the electronic device 11. However, the invention is not limited thereto.

Figure 4:
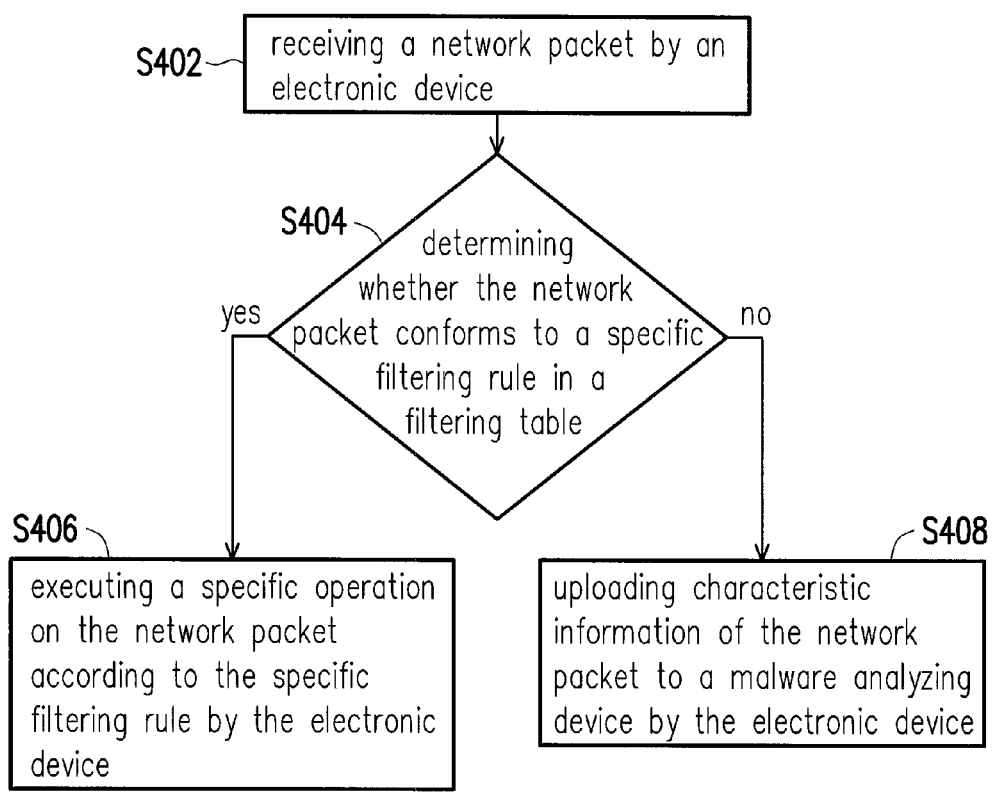
FIG. 4 is a flow chart depicting a malware defending method according to an exemplary embodiment of the invention.

FIG. 4 is a flow chart depicting a malware defending method according to an exemplary embodiment of the invention.

With reference to FIG. 2 and FIG. 4, in Step S402, a network packet is received by the electronic device 11 (or the network module 114), wherein the electronic device 11 (or the database module 112) stores a filtering table therein, and this filtering table includes at least one filtering rule. Then, in Step S404, the electronic device 11 (or the preliminary processing module 116) determines whether the network packet conforms to one or more than one specific filtering rule in the filtering table.

If the network packet conforms to one or more than one specific filtering rule in the filtering table, in Step S406, the electronic device 11 (or the preliminary processing module 116) executes a specific operation on the network packet according to the one or more than one specific filtering rule. On the other hand, if the network packet does not conform to the one or more than one specific filtering rule in the filtering table, in Step S408, the electronic device 11 (or the preliminary processing module 116) uploads characteristic information of the network packet to the malware analyzing device 12 via the network module 114.

It should be understood that the malware defending method of the invention may be adjusted for different applications and thus is not limited to the steps illustrated in FIG. 4.

Figure 5:
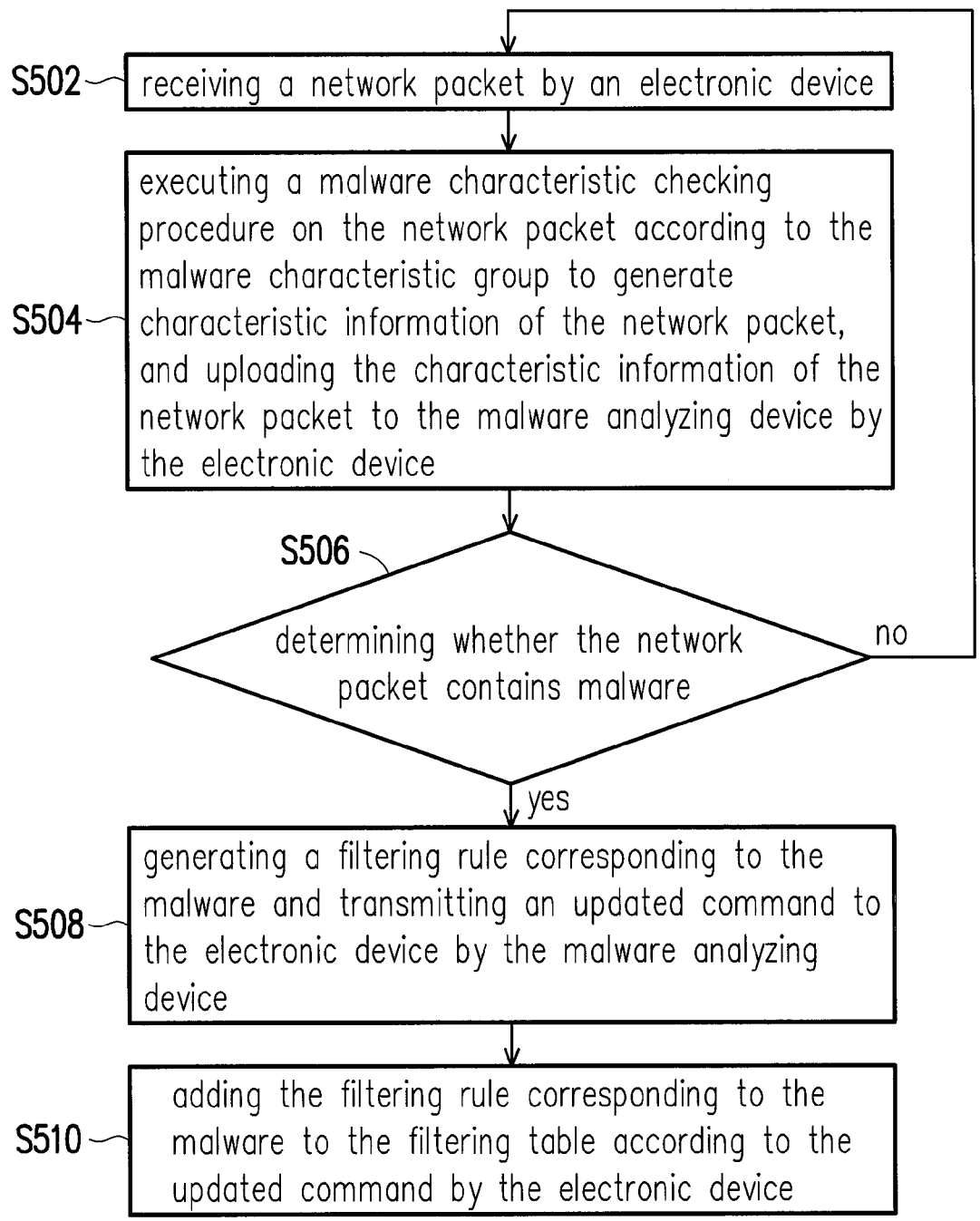
FIG. 5 is a flow chart depicting a method for updating a filtering table according to an exemplary embodiment of the invention.

FIG. 5 is a flow chart depicting a method for updating a filtering table according to another exemplary embodiment of the invention.

With reference to FIG. 2 and FIG. 5, in Step S502, a network packet is received by the electronic device 11 (or the network module 114), wherein the electronic device 11 (or the database module 112) stores at least one malware characteristic group and a filtering table therein.

Then, in Step S504, the electronic device 11 (or the preliminary processing module 116) executes a malware characteristic checking procedure on the network packet according to the at least one malware characteristic group to generate characteristic information of the network packet and upload the characteristic information of the network packet to the malware analyzing device 12 via the network module 114.

Next, in Step S506, the malware analyzing device 12 (or the advanced processing module 126) determines whether the network packet contains malware according to the characteristic information of the network packet.

If the network packet contains malware, in Step S508, the malware analyzing device 12 (or the advanced processing module 126) generates a filtering rule corresponding to the malware and transmits an updated command to the electronic device 11 via the network module 124.

Thereafter, in Step S510, the electronic device 11 (or the preliminary processing module 116) adds the filtering rule corresponding to the malware to the filtering table in the database module 112 according to the updated command.

Furthermore, in Step S506, if the malware analyzing device 12 (or the advanced processing module 126) determines that the network packet does not contain any malware (e.g. known malware), Step S502 is repeated.

Figure 6:
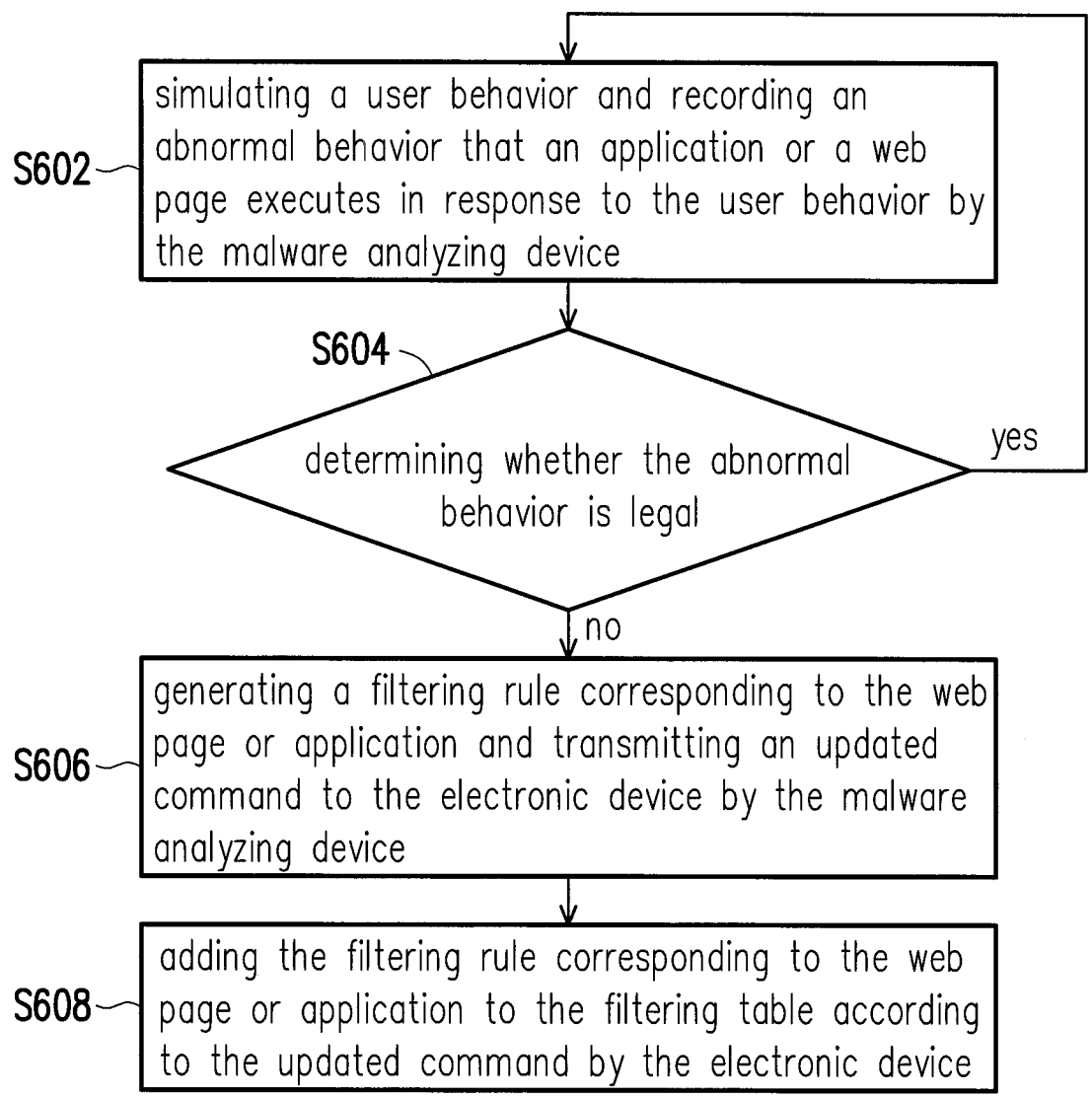
FIG. 6 is a flow chart depicting a method for updating a filtering table according to another exemplary embodiment of the invention.

FIG. 6 is a flow chart depicting a method for updating a filtering table according to another exemplary embodiment of the invention.

With reference to FIG. 2 and FIG. 6, in Step S602, the malware analyzing device 12 (or the advanced processing module 126) simulates a user behavior and records an abnormal behavior that an application or a web page executes in response to the user behavior.

Then, in Step S604, the malware analyzing device 12 (or the advanced processing module 126) determines whether the abnormal behavior is legal. If the abnormal behavior is legal (e.g. simply a change of a function of the web page or application), Step S602 is repeated according to a specific rule.

However, if the abnormal behavior is illegal, in Step S606, the malware analyzing device 12 (or the advanced processing module 126) generates a filtering rule corresponding to the web page or application and transmits an updated command to the electronic device 11.

Thereafter, in Step S608, the electronic device 11 (or the preliminary processing module 116) adds the filtering rule corresponding to the web page or application to the filtering table according to the updated command.

To sum up, the malware defending method and system of the invention only require the electronic device at the user end to perform simple comparison of the packet content, and leave the sorting and determination, which require more system resources, to be executed by the malware analyzing device at the server end. Accordingly, the problems such as excessive network traffic and/or consumption of resources, which result from using the system at the server end or the user end solely for malware detection, are improved with effectiveness so as to achieve the effects of improving the defending capability of the electronic device against malware and reducing consumption of the system resources. With respect to the protection window period between virus outbreak and release of virus code, the invention further provides a solution to strengthen protection of the electronic device, thereby effectively improving defects that may exist in the traditional antivirus software or intrusion detection system.

Furthermore, the filtering table updating method of the invention coordinates the electronic device at the user end and the malware analyzing device at the server end to perform analysis so as to determine whether to update the filtering table at the user end, thereby reducing the burden on the systems of the server and the end user and strengthening the malware report mechanism.

It will be apparent to those skilled in the art that various modifications and variations can be made to the disclosed embodiments without departing from the scope or spirit of the invention. In view of the foregoing, it is intended that the invention covers modifications and variations of this disclosure provided that they fall within the scope of the following claims and their equivalents.

What is claimed is:

1. A malware defending method, comprising:
   receiving a network packet by an electronic device, wherein the electronic device stores a filtering table;
   determining whether the network packet conforms to at least one specific filtering rule in the filtering table by the electronic device;
   executing a specific operation on the network packet according to the at least one specific filtering rule by the electronic device if the network packet conforms to at least one specific filtering rule in the filtering table;
   uploading characteristic information of the network packet to a malware analyzing device by the electronic device if the network packet does not conform to the at least one specific filtering rule in the filtering table; and
   determining whether the network packet contains malware according to the characteristic information of the network packet by the malware analyzing device,
   wherein the step of determining whether the network packet contains the malware according to the characteristic information of the network packet by the malware analyzing device comprises:
      re-sorting the characteristic information of the network packet according to at least one malware script by the malware analyzing device; and
      determining whether the network packet contains the malware according to the re-sorted characteristic information by the malware analyzing device.

2. The malware defending method according to claim 1, further comprising:
   storing at least one malware characteristic group by the electronic device; and
   executing at least one malware characteristic checking procedure on the network packet according to the at least one malware characteristic group by the electronic device to generate the characteristic information of the network packet.

3. The malware defending method according to claim 2, wherein a first malware characteristic group of the at least one malware characteristic group comprises a plurality of malware characteristics, and the step of executing the at least one malware characteristic checking procedure on the network packet according to the at least one malware characteristic group by the electronic device comprises:
   in a first malware characteristic checking procedure corresponding to the first malware characteristic group, sequentially checking data in the network packet by the electronic device in a position order that the malware characteristics correspond to the network packet.

4. The malware defending method according to claim further comprising:
   generating a filtering rule corresponding to the malware and transmitting an updated command by the malware analyzing device if the network packet contains the malware; and
   receiving the updated command from the malware analyzing device by the electronic device, and adding the filtering rule corresponding to the malware to the filtering table according to the updated command.

5. The malware defending method according to claim 4, wherein the malware analyzing device stores the at least one malware script corresponding to at least one malware characteristic group.

6. The malware defending method according to claim 4, wherein the step of generating the filtering rule corresponding to the malware and transmitting the updated command by the malware analyzing device comprises:
   setting the filtering rule corresponding to the malware as a removing command by the malware analyzing device if the malware is removable malware; and
   setting the filtering rule corresponding to the malware as a blocking command by the malware analyzing device if the malware is not removable malware.

7. The malware defending method according to claim 6, further comprising:
   when the electronic device receives another network packet that contains the malware, removing at least a part of the malware in the another network packet according to the removing command or blocking the another network packet according to the blocking command by the electronic device.

8. The malware defending method according to claim 1, further comprising:
   simulating a user behavior and recording an abnormal behavior that an application or a web page executes in response to the user behavior by the malware analyzing device;
   generating a filtering rule corresponding to the application or the web page and transmitting an updated command by the malware analyzing device if the abnormal behavior is illegal; and
   receiving the updated command from the malware analyzing device by the electronic device and adding the filtering rule corresponding to the application or the web page to the filtering table according to the updated command.

9. The malware defending method according to claim 1, further comprising:
   transmitting a network control command by the malware analyzing device; and
   receiving the network control command from the malware analyzing device by the electronic device, and controlling at least a portion of a connection between the electronic device and an Internet according to the network control command.

10. A malware defending system, comprising:
a malware analyzing device; and
an electronic device and, wherein the electronic device comprises:
a first network interface card configured to receive a network packet;
a first memory configured to store a filtering table; and
a preliminary processor coupled to the first network interface card and the first memory, wherein the preliminary processor configured to determine whether the network packet conforms to at least one specific filtering rule in the filtering table,
wherein the preliminary processor further configured to execute a specific operation on the network packet according to the at least one specific filtering rule if the network packet conforms to the at least one specific filtering rule in the filtering table, and
wherein the preliminary processor further configured to upload characteristic information of the network packet to the malware analyzing device via the first network interface card if the network packet does not conform to the at least one specific filtering rule in the filtering table,
wherein the malware analyzing device comprises:
a second network interface card configured to receive the characteristic information of the network packet; and
an advanced processor, coupled to the second network interface card and configured to determine whether the network packet contains malware according to the characteristic information of the network packet,
wherein the advanced processor further configured to re-sort the characteristic information of the network packet according to at least one malware script,
wherein the advanced processor further configured to determine whether the network packet contains the malware according to the re-sorted characteristic information.

11. The malware defending system according to claim 10, wherein the first memory further configured to store at least one malware characteristic group,
wherein the preliminary processor further configured to execute at least one malware characteristic checking procedure on the network packet according to the at least one malware characteristic group to generate the characteristic information of the network packet.

12. The malware defending system according to claim 11, wherein a first malware characteristic group of the at least one malware characteristic group comprises a plurality of malware characteristics,
wherein, in a first malware characteristic checking procedure corresponding to the first malware characteristic group, the preliminary processor sequentially checks data in the network packet in a position order that the malware characteristics correspond to the network packet.

13. The malware defending system according to claim 10, wherein the advanced processor further configured to generate a filtering rule corresponding to the malware and transmit an updated command via the second network interface card if the network packet contains the malware, and
wherein the first network interface card further configured to receive the updated command from the malware analyzing device, and the preliminary processor further configured to add the filtering rule corresponding to the malware to the filtering table according to the updated command.

14. The malware defending system according to claim 13, wherein
the second memory further configured to store the at least one malware script corresponding to at least one malware characteristic group.

15. The malware defending system according to claim 13, wherein the advanced processor further configured to set the filtering rule corresponding to the malware as a removing command if the malware is removable malware; and
wherein the advanced processor further configured to set the filtering rule corresponding to the malware as a blocking command if the malware is not removable malware.

16. The malware defending system according to claim 15, wherein when the first network interface card receives another network packet that contains the malware, the preliminary processor further configured to remove at least a part of the malware in the another network packet according to the removing command or blocks the another network packet according to the blocking command.

17. The malware defending system according to claim 10, wherein the advanced processor further configured to simulate a user behavior and record an abnormal behavior that an application or a web page executes in response to the user behavior,
wherein the advanced processor further configured to generate a filtering rule corresponding to the application or the web page and transmits an updated command if the abnormal behavior is illegal, and
wherein the first network interface card further configured to receive the updated command from the malware analyzing device, and the preliminary processor further configured to add the filtering rule corresponding to the application or the web page to the filtering table according to the updated command.

18. The malware defending system according to claim 10, wherein the advanced processor further configured to transmit a network control command via the second network interface card, and
wherein the first network interface card further configured to receive the network control command from the malware analyzing device, and the preliminary processor further configured to control at least a portion of a connection between the first network interface card and an Internet according to the network control command.

19. A filtering table updating method, comprising:
executing at least one malware characteristic checking procedure on a network packet according to at least one malware characteristic group by an electronic device to generate characteristic information of the network packet and upload the characteristic information of the network packet to a malware analyzing device;
determining whether the network packet contains malware according to the characteristic information of the network packet by the malware analyzing device;
generating a filtering rule corresponding to the malware and transmitting an updated command by the malware analyzing device, if the network packet contains the malware; and
receiving the updated command from the malware analyzing device by the electronic device and adding the filtering rule corresponding to the malware to a filtering table according to the updated command, wherein the step of determining whether the network packet contains the malware according to the characteristic information of the network packet by the malware analyzing device comprises:

re-sorting the characteristic information of the network packet according to at least one malware script by the malware analyzing device; and determining whether the network packet contains the malware according to the re-sorted characteristic information by the malware analyzing device.

20. The filtering table updating method according to claim 19, wherein a first malware characteristic group of the at least one malware characteristic group comprises a plurality of malware characteristics, and the step of executing the at least one malware characteristic checking procedure on the network packet according to the at least one malware characteristic group by the electronic device comprises:

in a first malware characteristic checking procedure corresponding to the first malware characteristic group, sequentially checking data in the network packet by the electronic device in a position order that the malware characteristics correspond to the network packet.

21. The filtering table updating method according to claim 19, wherein the malware analyzing device stores at least one malware script corresponding to the at least one malware characteristic group.

22. The filtering table updating method according to claim 19, further comprising:

simulating a user behavior and recording an abnormal behavior that an application or a web page executes in response to the user behavior by the malware analyzing device;

generating a filtering rule corresponding to the application or the web page and transmitting an updated command by the malware analyzing device, if the abnormal behavior is illegal; and receiving the updated command from the malware analyzing device by the electronic device and adding the filtering rule corresponding to the application or the web page to the filtering table according to the updated command.

* * * * *